(12) United States Patent
Inoue et al.

(10) Patent No.: US 8,587,737 B2
(45) Date of Patent: Nov. 19, 2013

(54) DISPLAY DEVICE

(75) Inventors: Yuichi Inoue, Kanagawa (JP); Sho Sakamoto, Tokyo (JP)

(73) Assignee: Sony Corporation (JP)

( * ) Notice: Subject to any disclaimer, the term of this patent is extended or adjusted under 35 U.S.C. 154(b) by 44 days.

(21) Appl. No.: 13/445,528

(22) Filed: Apr. 12, 2012

(65) Prior Publication Data

US 2012/0268704 A1 Oct. 25, 2012

(30) Foreign Application Priority Data

Apr. 20, 2011 (JP) .................................. 2011-094269

(51) Int. Cl.
*G02F 1/1335* (2006.01)

(52) U.S. Cl.
USPC .......................................................... 349/15

(58) Field of Classification Search
USPC .......................................................... 349/15
See application file for complete search history.

(56) References Cited

FOREIGN PATENT DOCUMENTS

JP 03-119889 5/1991

*Primary Examiner* — Phu Vu
(74) *Attorney, Agent, or Firm* — Sheridan Ross P.C.

(57) ABSTRACT

A display device includes: a display section including display pixels; and a liquid crystal barrier section including barrier regions. Each of the barrier regions extends in a first direction that is inclined with respect to an array direction of the display pixels, and allows light to transmit therethrough and blocks the light. The liquid crystal barrier section includes a liquid crystal layer, and a first electrode layer and a second electrode layer interposing the liquid crystal layer in between. The first electrode layer includes a plurality of line-shaped electrodes. The line-shaped electrodes extend in the first direction and arranged side-by-side in a second direction different from the first direction, and one or more of the line-shaped electrodes includes first slits and second slits extending in respective directions different from the array direction of the display pixels.

15 Claims, 18 Drawing Sheets

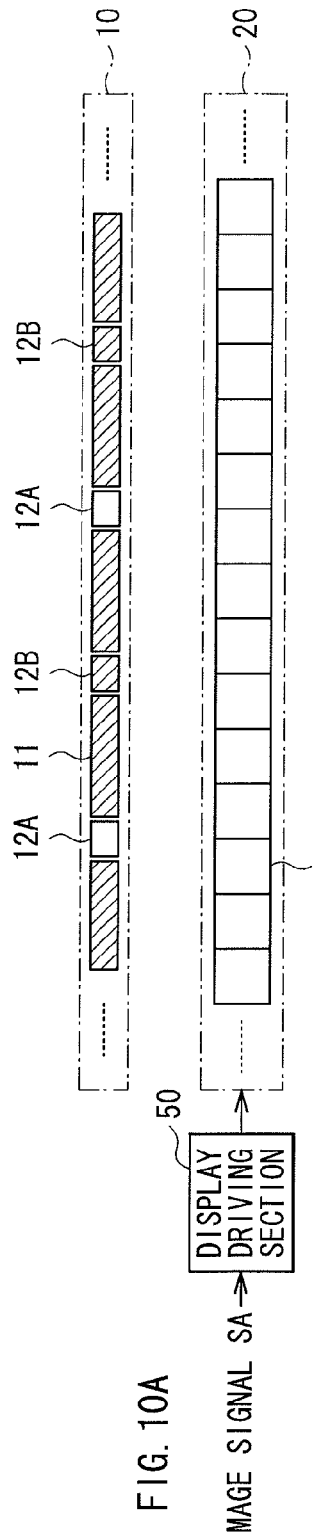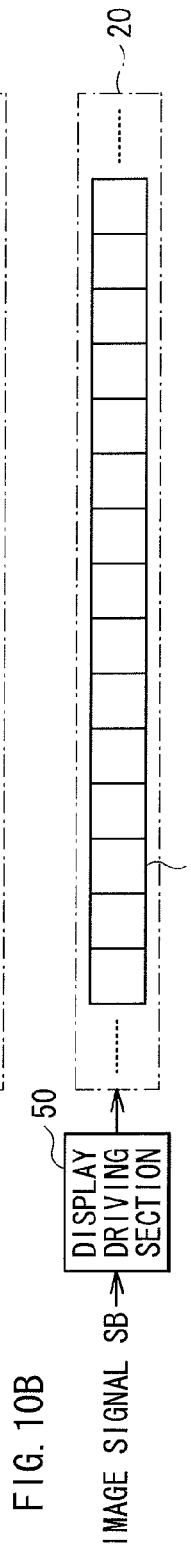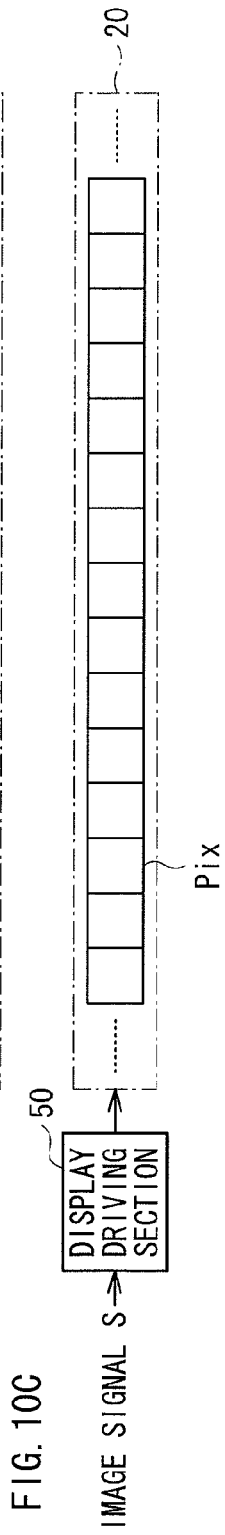

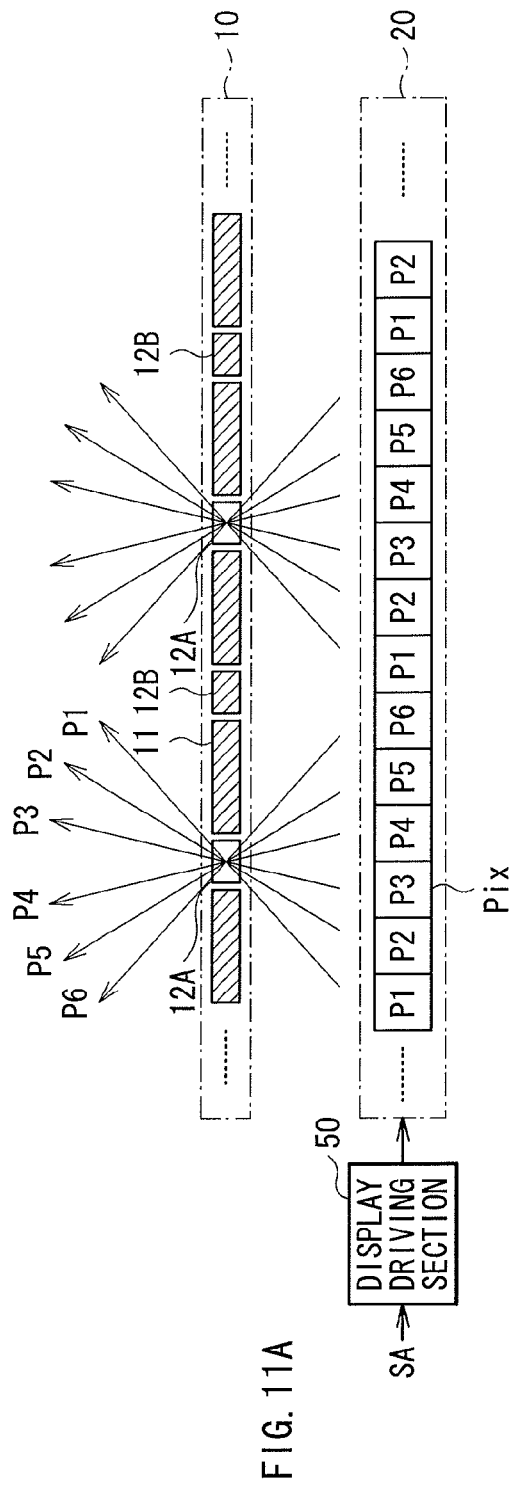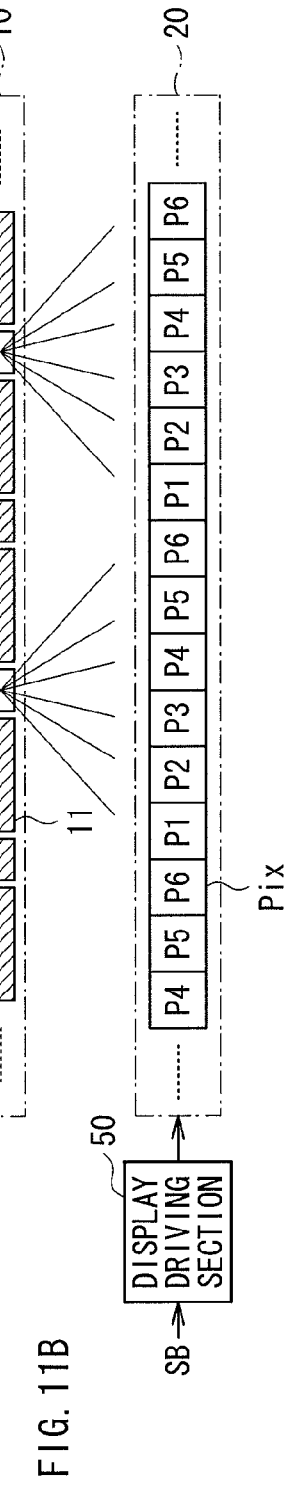
FIG. 11A
FIG. 11B

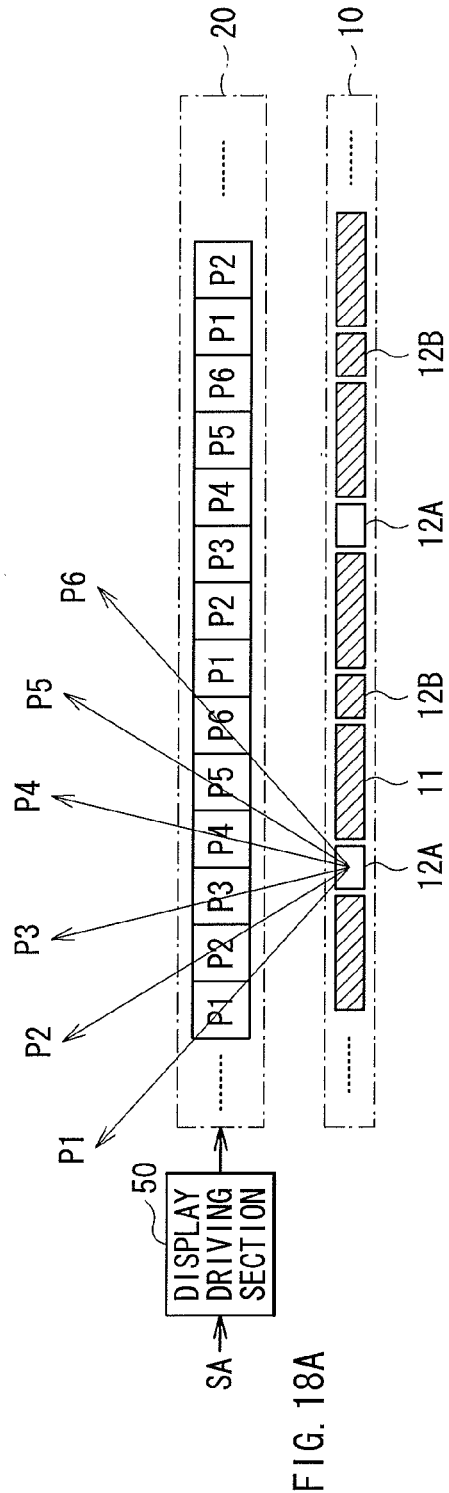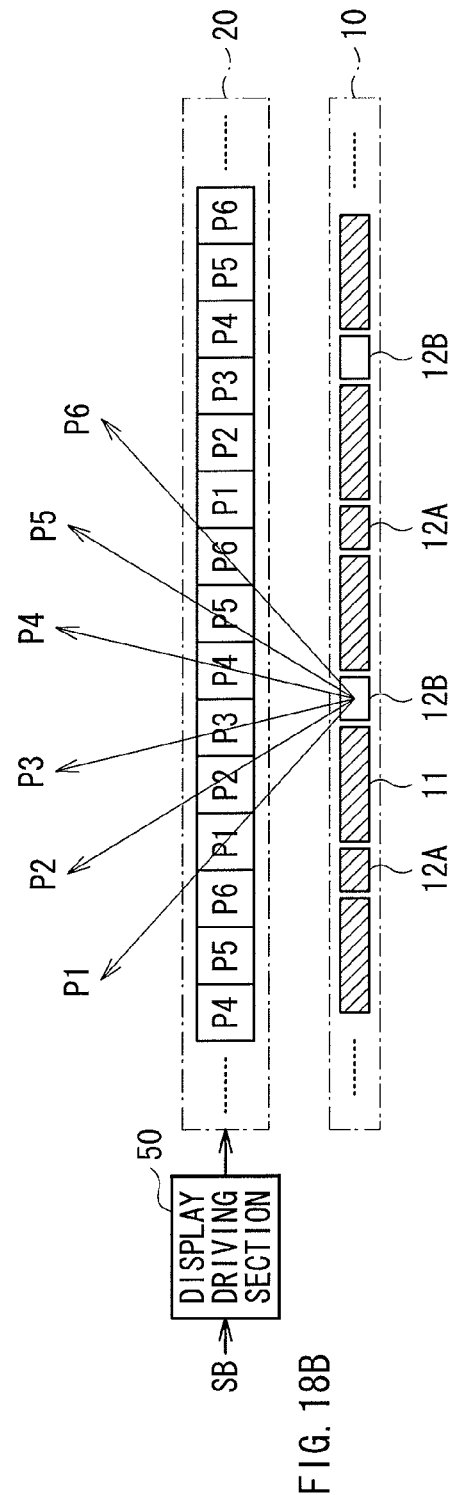

DISPLAY DEVICE

BACKGROUND

The present disclosure relates to a display device of a parallax barrier type which enables stereoscopic display.

In recent years, display devices for realizing stereoscopic display have been attracting interest. The stereoscopic display is performed by independently displaying parallax images (or different perspective images) for right and left eyes. When seeing these images with the corresponding eyes, the viewer recognizes the images as a stereoscopic image having a stereoscopic effect. Moreover, another type of display devices, which present the viewer with a more natural three-dimensional image by displaying more than two parallax images, are being developed.

Such display devices are classified into two types: one is necessary for exclusive glasses, and the other is unnecessary. Since wearing exclusive glasses may be troublesome for the viewer, the glasses-free type is preferable. Examples of a technique for realizing glasses-free display devices include the lenticular lens technique and the parallax barrier technique. These techniques are configured to display multiple parallax images (perspective images) at the same time, thereby presenting the viewer with an image that is changed depending on a relative distance (or angle) between the display device and the eye point of the viewer. An example of parallax barrier type display devices is disclosed in Japanese Unexamined Patent Application Publication No. H03-119889.

SUMMARY

Unfortunately, display devices employing the above-mentioned lenticular lens or parallax barrier technique are prone to display an image containing moire, due to the structure thereof. Until now, many improvements in decreasing moire have been proposed. Nevertheless, the further improvement in the quality of images is in demand.

It is desirable to provide a display device capable of achieving an improved image.

A display device according to an embodiment of the present disclosure includes: a display section including a plurality of display pixels; and a liquid crystal barrier section including a plurality of barrier regions. Each of the barrier regions extends in a first direction that is inclined with respect to an array direction of the display pixels, and allows light to transmit therethrough and blocks the light. The liquid crystal barrier section includes a liquid crystal layer, and a first electrode layer and a second electrode layer interposing the liquid crystal layer in between. The first electrode layer includes a plurality of line-shaped electrodes. The line-shaped electrodes extend in the first direction and arranged side-by-side in a second direction different from the first direction, and one or more of the line-shaped electrodes includes first slits and second slits. The first and the second slits extend in respective directions different from the array direction of the display pixels.

In the display device according to the embodiment of the present disclosure, the first electrode layer in the liquid crystal barrier section includes the plurality of line-shaped electrodes that extend in the first direction, and one or more of the line-shaped electrodes includes the first and the second slits extending in respective directions different from the array direction of the display pixels. This suppresses interference between dark lines due to regions between the display pixels of the display section and dark lines due to the slits of the liquid crystal barrier section, which is visually recognized when the display section and the liquid crystal barrier section are overlaid with each other.

According to the display device of the embodiment of the present disclosure, the array direction of the display pixels in the display section is misaligned with an extending direction of the first slits and an extending direction of the second slits in the liquid crystal barrier section. Hence, it is possible to decrease a periodic variation in apparent brightness of a display screen, thereby effectively suppressing the occurrence of moire on an image and achieving an improved image.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 10A, 10B, and 10C are schematic views depicting respective examples of operations of the display section and the liquid crystal barrier section shown in FIG. 1.

FIGS. 11A and 11B are schematic views depicting respective examples of other operations of the display section and the liquid crystal barrier section shown in FIG. 1.

FIGS. 18A and 18B are schematic views depicting respective examples of operations of the display device shown in FIGS. 17A and 17B.

DETAILED DESCRIPTION

An embodiment of the present disclosure will be described in detail below, with reference to the accompanying drawings.

(Whole Configuration)

Figure 1:
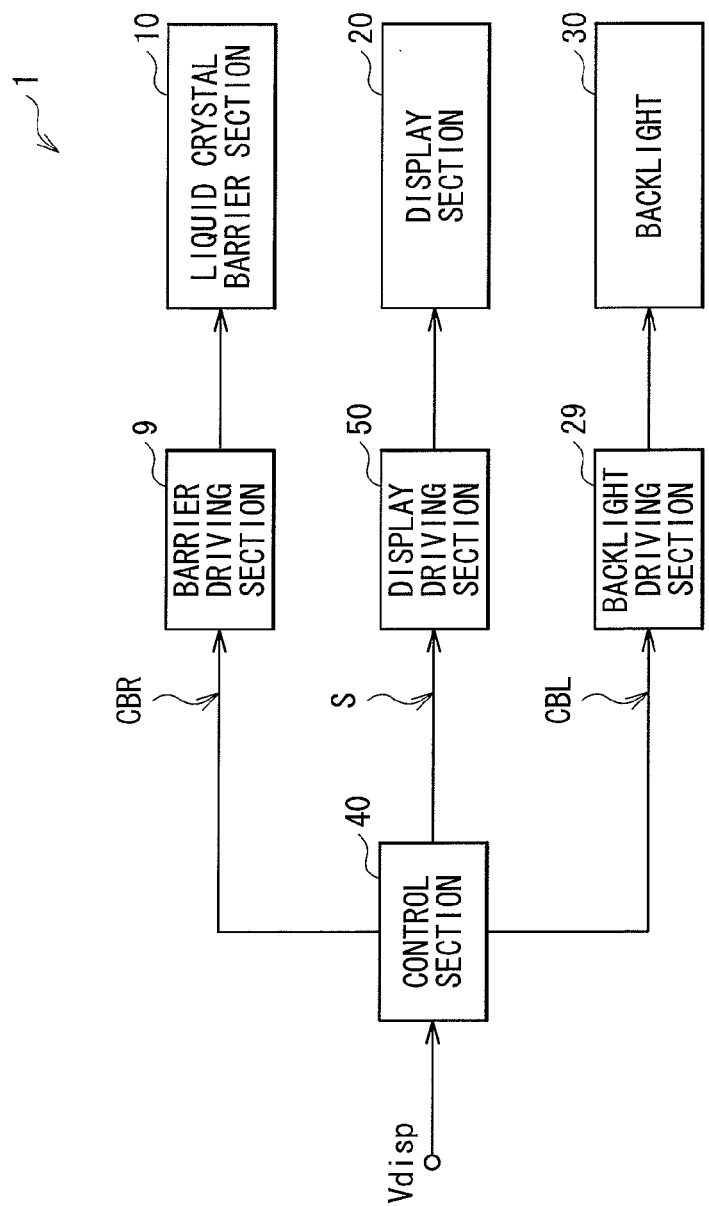
FIG. 1 is a block diagram depicting an example of a configuration of a display device according to an embodiment of the present disclosure.

FIG. 1 is a view depicting an example of a configuration of a display device 1 according to an embodiment of the present disclosure. This display device 1 enables both the stereoscopic display (3D display) and the normal display (2D display). The display device 1 includes a control section 40, a display driving section 50, a display section 20, a backlight driving section 29, a backlight 30, a barrier driving section 9, and a liquid crystal barrier section 10.

The control section 40 is a circuit that supplies respective control signals to the display driving section 50, the backlight driving section 29, and the barrier driving section 9, on the basis of an image signal Vdisp to be supplied from an external source, thereby controlling the display driving section 50, the backlight driving section 29, and the barrier driving section 9 so as to operate in synchronization with one another. Specifically, the control section 40 supplies an image signal S based on the image signal Vdisp, a backlight control signal CBL, and a barrier control signal CBR to the display driving section 50, the backlight driving section 29, and the barrier driving section 9, respectively. In this embodiment, the image signal S includes image signals SA and SB, each of which includes multiple ("six" in this embodiment) perspective images when the 3D display device 1 displays stereoscopic images, as described later.

The display driving section 50 drives the display section 20, on the basis of the image signal S to be supplied from the control section 40. The display section 20 modulates a light ray emitted from the backlight 30 by driving liquid crystal elements, in order to display images.

The backlight driving section 29 drives the backlight 30, on the basis of the backlight control signal CBL to be supplied from the control section 40. The backlight 30 has a function of emitting a light ray from a whole surface thereof toward the display section 20. This backlight 30 may include, for example, LEDs (light emitting diodes), CCFLs (cold cathode fluorescent lamps), or some other suitable light source.

The barrier driving section 9 drives the liquid crystal barrier section 10, on the basis of a barrier control instruction to be supplied from the control section 40. The liquid crystal barrier section 10 is provided with multiple opening-closing sections 11 and 12 (described later), each of which allows a light ray to transmit therethrough or blocks a light ray from transmitting therethrough. In this embodiment, the liquid crystal barrier section 10 has a function of splitting an optical image output from the display section 20 in a predetermined direction.

Figure 2A:
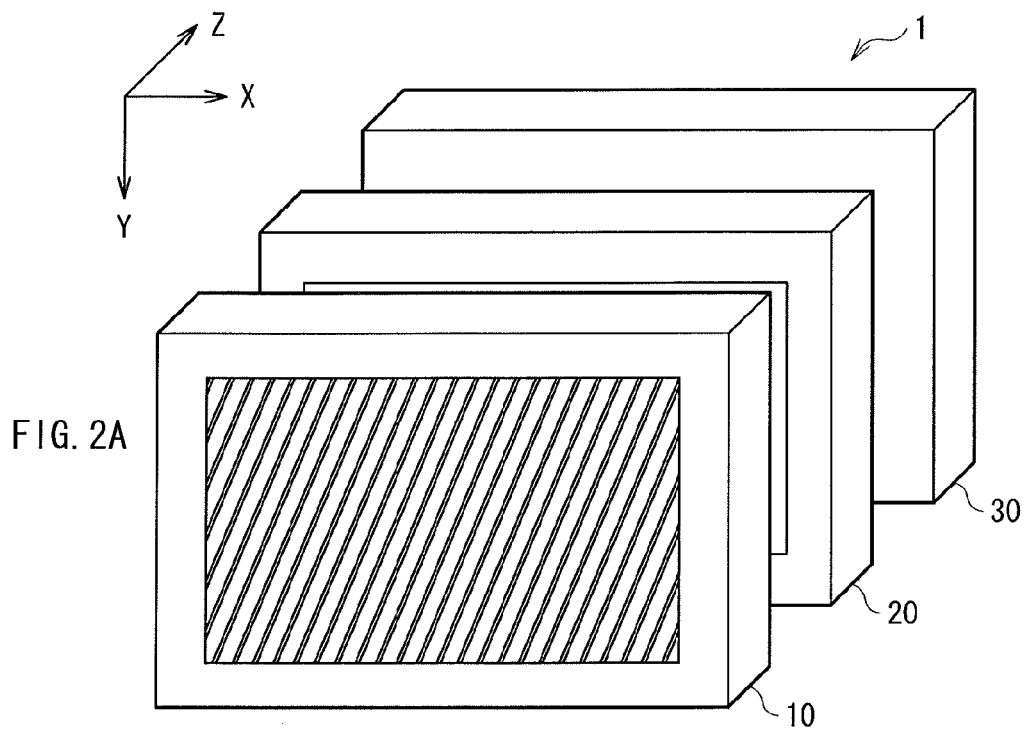
FIGS. 2A and 2B are views depicting an example of a structure of the display device shown in FIG. 1.
Figure 2B:
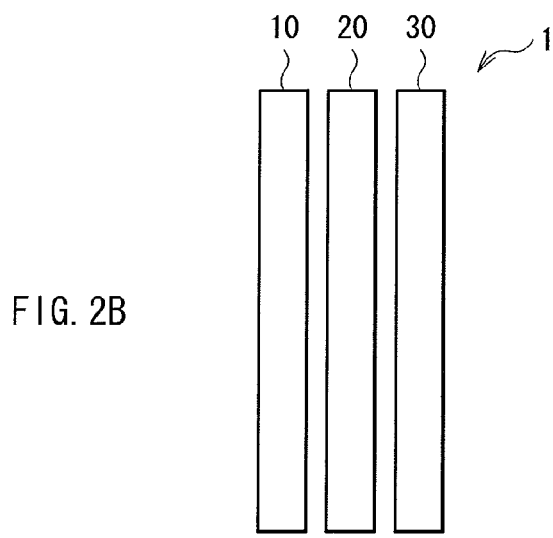

FIGS. 2A and 2B are views depicting an example of a structure of main parts of the display device 1. Specifically, FIG. 2A is a perspective view depicting the structure of the display device 1, and FIG. 2B is a side view depicting the structure thereof. As shown in FIGS. 2A and 2B, in the display device 1, the backlight 30, the display section 20, and the liquid crystal barrier section 10 are arranged in this order. In this structure, a light ray emitted from the backlight 30 passes through the display section 20 and the liquid crystal barrier section 10 in this order, and then reaches a viewer. Note that the display section 20 and the liquid crystal barrier section 10 may be bonded to each other, or may not.

(Display Driving Section 50 and Display Section 20)

Figure 3:
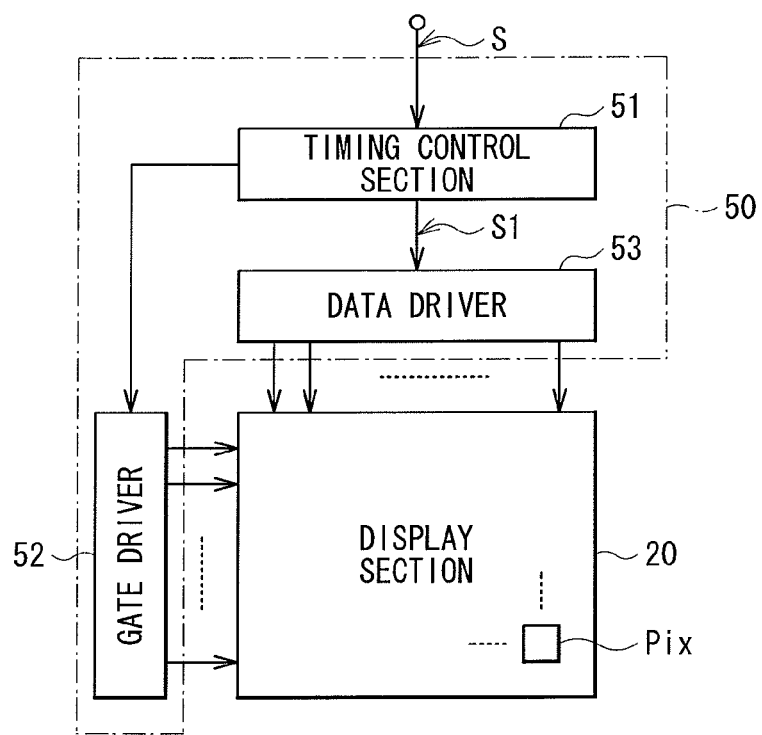
FIG. 3 is a view depicting an example of a structure of a display driving section and a display section shown in FIG. 1.

FIG. 3 is a view depicting an example of a block diagram of the display driving section 50 and the display section 20. In the display section 20, pixels Pix are arrayed in a matrix form. The display driving section 50 includes a timing control section 51, a gate driver 52, and a data driver 53. The timing control section 51 controls drive timings of the gate driver 52 and the data driver 53, and supplies the data driver 53 with the image signal S to be supplied from the control section 40, as an image signal 51. The gate driver 52 sequentially selects each row of pixels Pix (described later) in a liquid crystal display device 45, in accordance with the timing control performed by the timing control section 51, and line-sequentially scans the selected row. The data driver 53 supplies each pixel Pix of the display section 20 with a pixel signal based on the image signal S1. Specifically, the data driver 53 performs a D/A (digital/analog) conversion based on the image signal S1, thereby generating analogous pixel signals, and supplies the generated pixel signals to the corresponding pixels Pix.

The display section 20 may have a configuration in which a liquid crystal material is interposed and sealed between two transparent substrates made of, for example, glass or some other suitable material. On the portion of each transparent substrate which faces the liquid crystal material, transparent electrodes made of, for example, ITO (indium tin oxide) or some other suitable material are formed. These transparent electrodes constitute the pixels Pix together with the liquid material. The liquid crystal material of the display section 20 may be, for example, a liquid crystal in the VA, IPS, TN or some other suitable mode using a nematic liquid crystal. Next, a structure of the display section 20 (pixel Pix) will be described below.

Figure 4A:
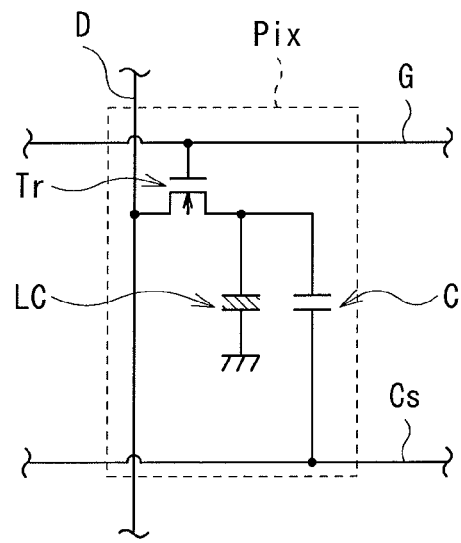
FIGS. 4A and 4B are views depicting an example of a circuit diagram of a pixel shown in FIG. 3, and an example of a cross-sectional structure of the pixel, respectively.

FIG. 4A is a view depicting an example of a circuit diagram of the pixel Pix. The pixel Pix includes a TFT (thin-film transistor) element Tr, a liquid crystal element LC, and a holding capacitive element C. The TFT element Tr may be, for example, a MOS-FET (metal oxide semiconductor-field effect transistor), and has a gate, a source, and a drain connected to a gate line G, a data line D, and one ends of the liquid crystal element LC and the holding capacitive element C, respectively. The liquid crystal element LC has respective ends connected to the GND and the drain of the TFT element Tr. The holding capacitive element C has respective ends connected to the drain of the TFT element Tr, and a holding capacitive line Cs. The gate line G is connected to the gate driver 52, and the data line D is connected to the data driver 53.

Figure 4B:
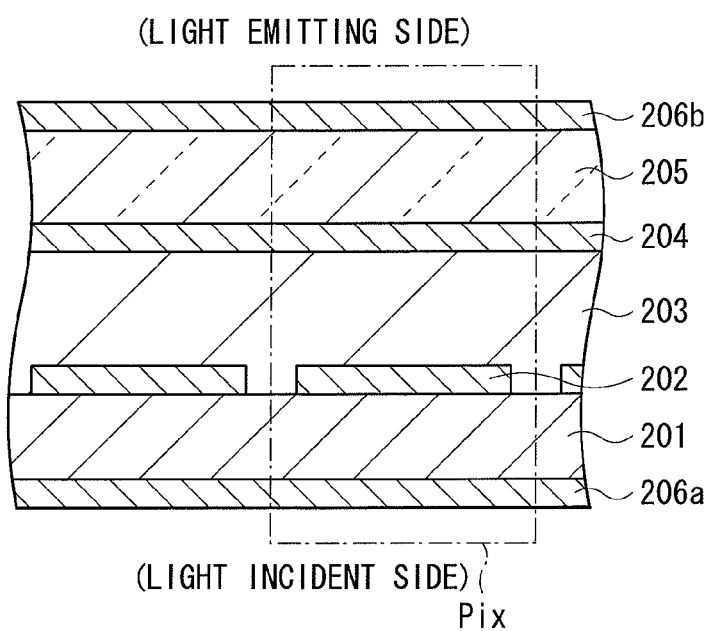

FIG. 4B is a view depicting a structure of a cross section of the display section 20 including the pixel Pix. As shown in FIG. 4B, the display section 20 has a configuration in which a liquid crystal layer 203 is interposed and sealed between a drive substrate 201 and a counter substrate 205. In the drive substrate 201, a pixel drive circuit including the above TFT element Tr is formed. Above this drive substrate 201, pixel electrodes 202 are arranged corresponding to the pixels Pix. In the counter substrate 205, a color filter and a black matrix (both not shown) are formed. In addition, on a surface of the counter substrate 205 which is closer to the liquid crystal layer 203, a counter electrode 204 is disposed as a common electrode for the pixels Pix. To a surface of the display section 20 on which a light ray is incident (or which is closer to the backlight 30 in this embodiment), a polarization plate 206a is bonded. Meanwhile, to the surface of the display section 20 from which the light is to be emitted (or which is closer to the liquid crystal barrier section 10 in this embodiment), a polarization plate 206b is bonded. The polarization plates 206a and 206b are arranged to constitute the cross Nicole or parallel Nicole.

Figure 5:
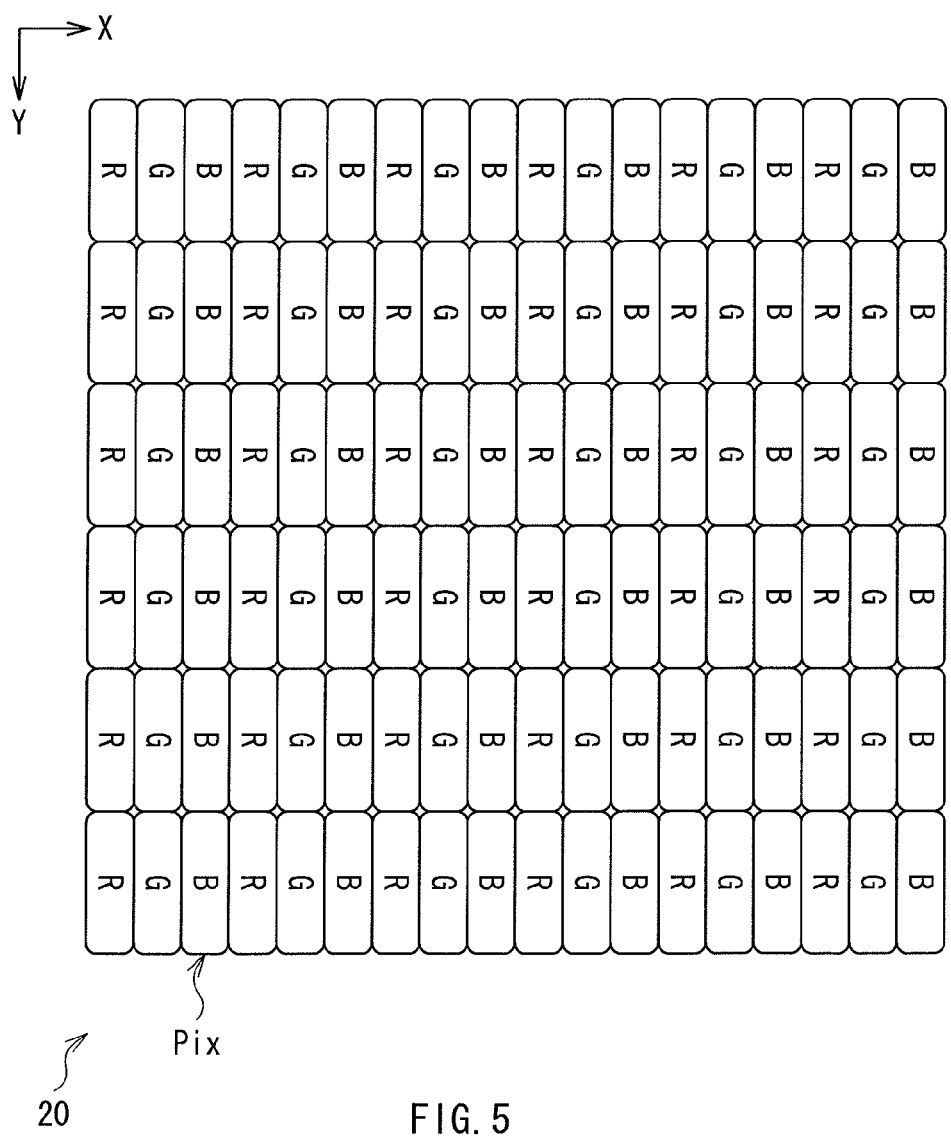
FIG. 5 is a plan view depicting an example of an array of pixels in the display section shown in FIG. 1.

FIG. 5 is a view depicting an example of an array of pixels in the display section 20. As shown in FIG. 5, the pixels Pix are arrayed in a matrix form within a plane (X-Y plane) parallel to the drive substrate 201 and the counter substrate 205. In more detail, the display section 20 has a pixel structure, in which the pixels Pix including three-color pixels (R (red), G (green), and B (blue)) necessary for color display are arrayed in a two-dimensional form. As shown in FIG. 5, the pixels Pix constitute a pixel array in which pixels of the same color appear at predetermined intervals on each row in a lateral direction of this figure (or an X axis), and pixels of a single color are aligned on each column in a vertical direction thereof (or a Y axis). The gate lines G connected to the gate driver 52 extend, for example, along the corresponding rows of the pixels Pix on the X axis, whereas the data lines D extend, for example, along the corresponding columns of the pixels Pix on the Y axis. In this manner, the display section 20 may have the data lines D and the gate lines G as signal lines and scanning lines, respectively, in order to supply voltages to the pixels Pix, and the pixels Pix may be arrayed in a matrix form along the data lines D and the gate lines G.

(Backlight 30)

The backlight 30 may include, for example, an array of LEDs (light emitting diodes) disposed, for example, on a side surface of an optical waveguide. Alternatively, the backlight 30 may include an array of CCFLs (cold cathode fluorescent lamps) or some suitable other light source.

(Liquid Crystal Barrier Section 10)

Figure 6:
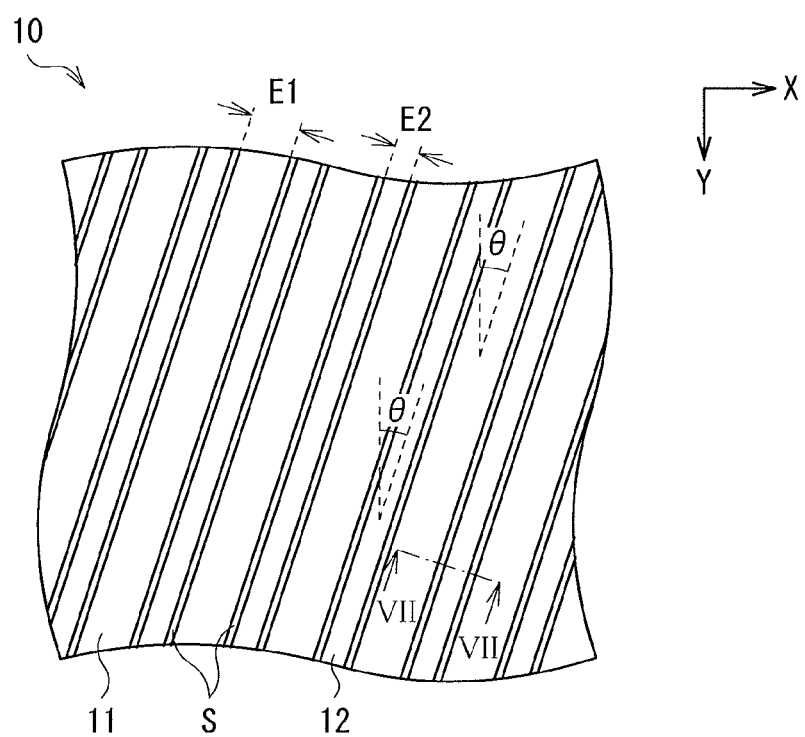
FIG. 6 is a schematic view depicting an example of a planar structure of a liquid crystal barrier section shown in FIG. 1.
Figure 7:
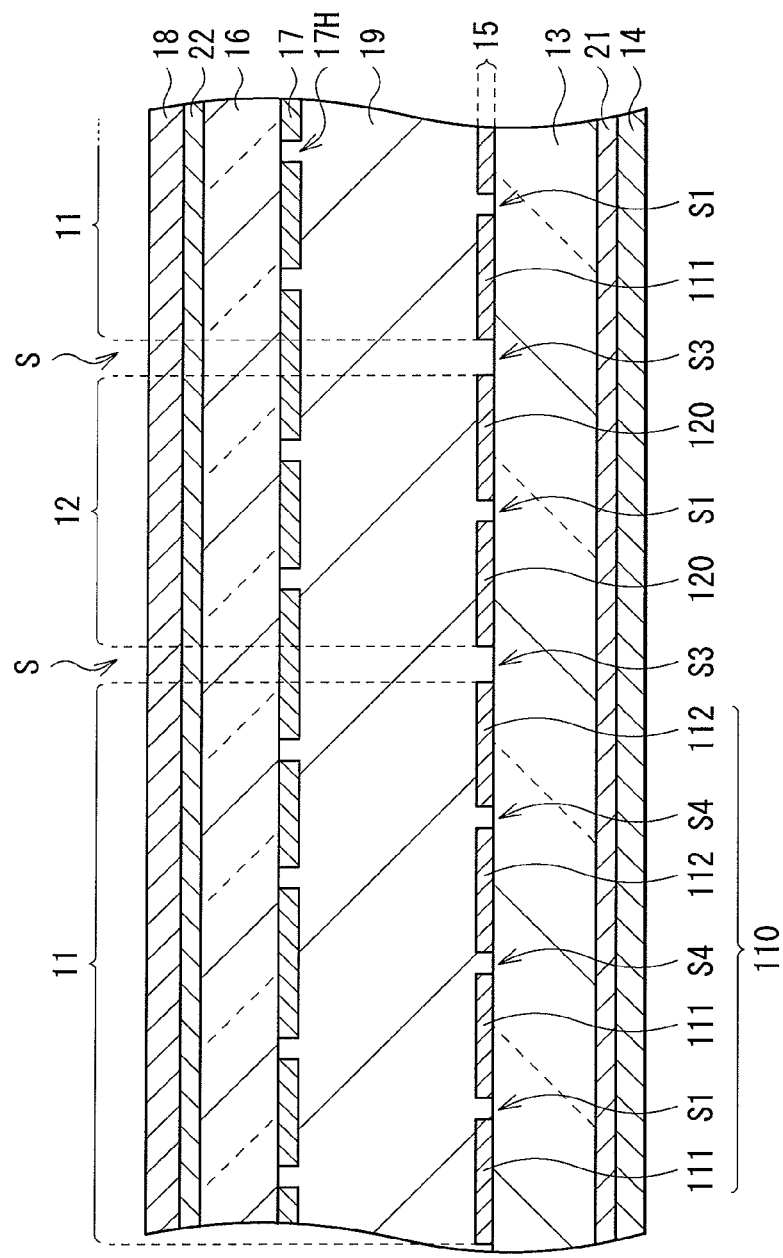
FIG. 7 is a view depicting an example of a cross-sectional structure of the liquid crystal barrier section shown in FIG. 1.

FIG. 6 is a view depicting an example of the opening-closing sections 11 and 12 of the liquid crystal barrier section 10 which are arranged on the X-Y plane. FIG. 7 is a view schematically depicting a cross section of the liquid crystal barrier section 10. Specifically, FIG. 7 is a view depicting a cross section taken in the direction of arrows along a VII-VII line of FIG. 6.

The liquid crystal barrier section 10 is a so-called parallax barrier, and includes multiple opening-closing sections 11 (second sub-regions), and multiple opening-closing sections 12 (first sub-regions) that allow a light ray to transmit therethrough or block a light ray from transmitting therethrough, as shown in FIGS. 6 and 7. These opening-closing sections 11 and 12 operate differently, depending on whether the display device 1 performs the normal display (2D display) or the stereoscopic display (3D display). In more detail, each opening-closing section 11 enters an open state (or a transmission state) upon normal display, whereas entering a closed state (or a blocking state) upon stereoscopic display, as described later. Each opening-closing section 12 enters an open state (or a transmission state) upon normal display, whereas performing an open or close operation in a time division manner, as described later. These opening-closing sections 11 and 12 are arranged alternately. Further, the opening-closing sections 11 and 12 operate for each group constituted by selective ones among the opening-closing sections 11 and 12, and the driving of each group is performed in a time division manner.

The opening-closing sections 11 and 12 extend in one direction (for example, in a direction forming a predetermined angle θ with the Y axis in this embodiment) on the X-Y plane with borders S in between. This angle θ may be set to 18 degrees, for example. The opening-closing sections 11 and 12 have different widths E1 and E2, respectively, and the widths E1 and E2 have a relationship of E1>E2 (for example, E1 is approximately equal to 2×E2) in this embodiment. However, note that the more or less relationship between opening-closing sections 11 and 12 is not limited thereto. Alternatively, the relationship may be either E1<E2 or E1=E2. The borders S are, for example, parts corresponding to grooves (or slits S3 (described later)) between the transparent electrodes 110 and 120. The opening-closing sections 11 and 12 include a liquid crystal layer (or a liquid crystal layer 19 (described later)), and the switching between the open and close thereof is carried out in accordance with a drive voltage to be applied to this liquid crystal layer 19.

Specifically, the liquid crystal barrier section 10 includes transparent substrates 13 and 16 made of, for example, glass or some other suitable material, and the liquid crystal layer 19 formed therebetween, as shown in FIG. 7. The transparent substrate 13 is disposed close to a surface of the liquid crystal barrier section 10 which a light ray is to enter, whereas the transparent substrate 13 is disposed close to a surface thereof from which a light ray is to be output. In addition, a transparent electrode layer 15 is formed on a surface of the transparent substrate 13 which is closer to the liquid crystal layer 19, whereas the transparent electrode layer 17 is formed on a surface of the transparent substrate 16 which is closer to the liquid crystal layer 19. Each of the transparent electrode layers 15 and 17 may be made of, for example, ITO. Furthermore, a phase difference plate 21 and a polarization plate 14 are bonded to a surface of the transparent substrate 13 on which a light ray is incident, in this order. Meanwhile, a phase difference plate 22 and a polarization plate 18 are bonded to a surface of the transparent substrate 16 from which a light ray is emitted, in this order. The liquid crystal layer 19 may be made of, for example, a liquid crystal in a VA (vertical orientation) mode. In the following, the above components will be described in detail.

The transparent electrode layer 15 is split into multiple transparent electrodes 110 and 120, to each of which a voltage is to be applied. Meanwhile, the transparent electrode layer 17 is provided as a common electrode for the transparent electrodes 110 and 120. In this embodiment, 0 V is applied to the transparent electrode layer 17. One transparent electrode 110 of the transparent electrode layer 15 and a portion of the transparent electrode layer 17 which correspond to this transparent electrode 110 constitute a single opening-closing section 11 as a sub-region. Likewise, one transparent electrode 120 of the transparent electrode layer 15 and a portion of the transparent electrode layer 17 which corresponds to this transparent electrode 120 constitute a single opening-closing section 12 as a sub-region. Furthermore, the transparent electrode layer 17 has multiple pin holes 17H (omitted in FIG. 6) provided at locations which correspond to the respective transparent electrodes 110 and 120. In this structure, when voltages are selectively applied to the transparent electrodes 110 and 120 of the liquid crystal barrier section 10, a liquid crystal orientation of the liquid crystal layer 19 is changed in accordance with the applied voltages. This enables each of the opening-closing sections 11 and 12 to perform an open or close operation. Note that although not shown in figures, orientation layers are formed on respective surfaces of the transparent electrode layers 15 and 17 which are closer to the liquid crystal layer 19.

The polarization plates 14 and 18 control the polarization directions of light rays that are to enter the liquid crystal layer 19 and to be output therefrom. For example, light-transmitting axes of the polarization plates 14 and 18 may correspond to the X and Y axes, respectively. In other words, the light-transmitting axes of the polarization plates 14 and 18 may be arranged intersecting each other.

Each of the phase difference plates 21 and 22 may be, for example, a ¼ (quarter) wavelength plate having an in-plane phase difference of approximately 140 nm, and converts a linear polarization into a circular (or elliptical) polarization, or the opposite.

Figure 8:
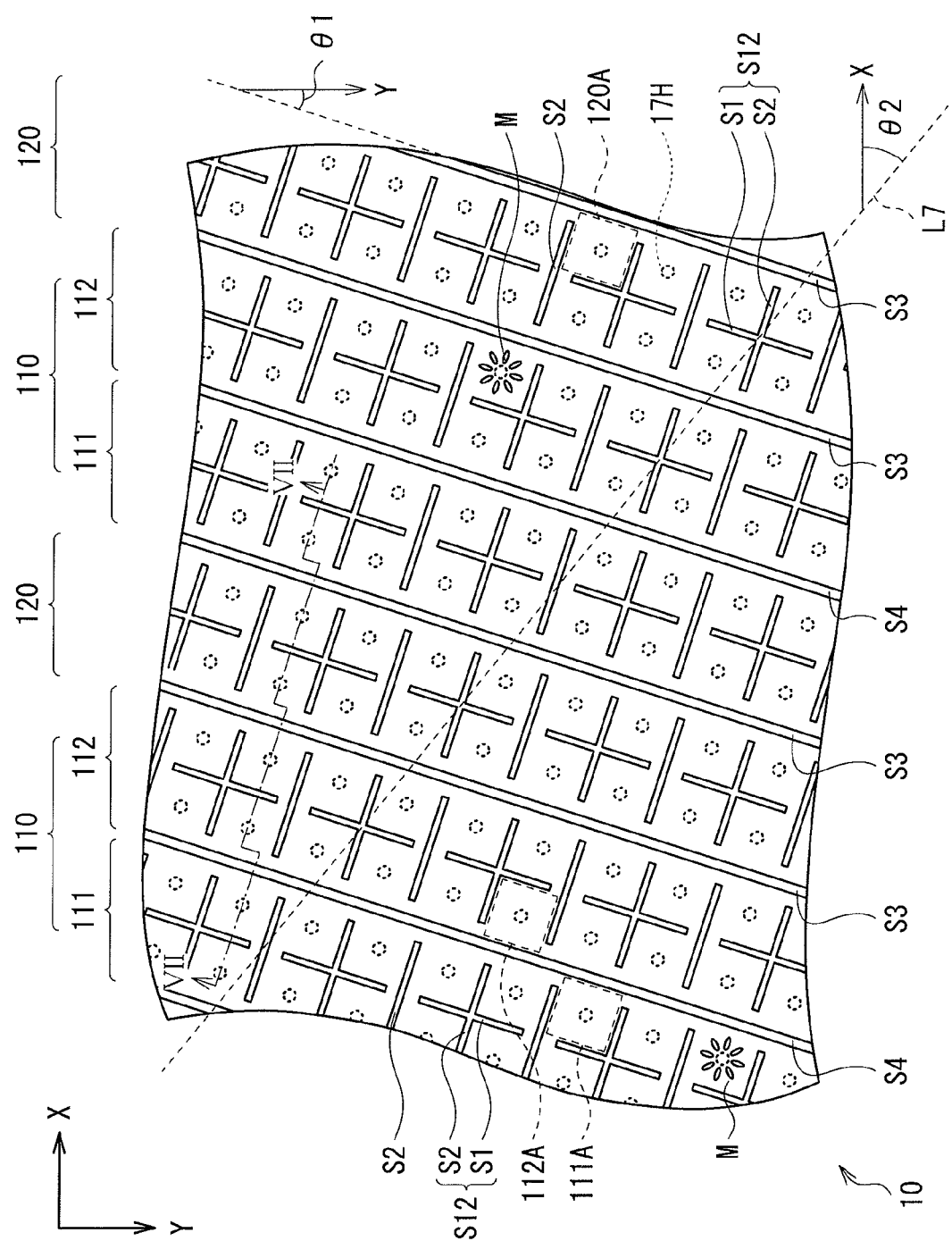
FIG. 8 is a plan view depicting an example of a structure of transparent electrodes in the liquid crystal barrier section shown in FIG. 1.

FIG. 8 is a view depicting an example of the transparent electrodes 110 and 120 arranged in the transparent electrode layer 15. In FIG. 8, dotted circles on the transparent electrodes 110 and 120 indicate the locations of the pin holes 17H in the transparent electrode layer 17. Note that FIG. 7 corresponds to a cross section taken in the direction of arrows along a line VII-VII of FIG. 8. Each of the transparent electrodes 110 and 120 is a line-shaped electrode that extends in the same direction as the extending direction of the opening-closing sections 11 and 12 (or in a direction forming an angle $\theta 1$ with the Y axis). In addition, the transparent electrodes 110 and 120 are arranged in a direction of widths thereof (or in a direction perpendicular to the above extending direction), and are separated from one another by corresponding slits S3 formed in the border S.

Each transparent electrode 110 includes a pair of line-shaped electrodes 111 and 112 that are arranged to oppose each other with the slit S4 in between. It is preferable that the line-shaped electrodes 111 and 112 have substantially the same width, and the transparent electrode 120 also have substantially the same width as the line-shaped electrode 111 or 112. Each pair of line-shaped electrodes 111 and 112 are electrically connected to each other at one ends thereof through a connecting portion (not shown), and a common voltage potential is applied thereto. Each of the line-shaped electrodes 111 and 112 includes two slits S1 and S2 extending in respective directions, each of which differs from the directions the pixels Pix are arrayed in. Each of the slits S1 and S2 is separated from the slits S3 and S4 and, therefore is not connected to the slits S3 and S4. As shown in FIG. 8, each slit S1 extends in the extending direction of the transparent electrode 110 (or in a direction forming the angle $\theta 1$ with the Y axis), similar to the slits S3 and S4. Meanwhile, each slit S2 extends in a direction intersecting (for example, in a direction orthogonal to) the extending direction of the slits S1 (or in a direction along the widths of the transparent electrodes 110). The slits S2 are arranged (for example, at regular intervals substantially) in the extending direction of the transparent electrodes 110, while being separated from one another. The length of each slit S2 is shorter than the width of each line-shaped electrode 111 or 112. The slits S1 are provided so as to alternately intersect the slits S2 arranged in the above manner. In more detail, on each of the line-shaped electrodes 111 and 112, cross-shaped slits S12, each of which is formed by crossing the slits S1 and S2, and isolated line-shaped slits S2, each of which does not intersect the slit S1, are arranged alternately in the extending direction of the transparent electrode 110. The slits S1 are formed, for example, at locations where the width of each of the line-shaped electrodes 111 and 112 is split into substantially two halves. Note that the arrangement of the slits S1 is not limited to that where the slits S1 are provided in the extending direction of the transparent electrode 110 while being separated from one another as shown in FIG. 8. Alternatively, for example, a single slit S1 may be provided continuously (i.e., without any separation) across both edges of a region corresponding to a screen of the display section 20.

The slits S1 to S4 arranged in the above manner partition each line-shaped electrode 111 into small regions 111A, as well as partition each line-shaped electrode 112 into small regions 112A. Each of the small regions 111A and 112A may have, for example, a square shape. All the small regions 111A of each line-shaped electrode 111 are connected to one another through respective portions between the slits S1 forming the slits S12 and the isolated slits S2, between the slits S2 and S3, and between the slits S2 and S4. This connecting manner is also applied to the small regions 112A of the line-shaped electrode 112. Note that the pin holes 17H are formed in respective locations of the transparent electrode layer 17 which correspond to the centers of the small regions 111A and 112A in the thickness direction. Moreover, each of the small regions 111A and 112A is smaller than a region which one of the pixels Pix occupies on the display section 20.

Each transparent electrode 120 has a structure similar to that of the line-shaped electrode 111 or 112, and is partitioned into small regions 120A having, for example, a square shape by the slits S1 and S2. The cross-shaped slits S12 and the isolated slits S2 in each of the line-shaped electrodes 111 and 112 and the transparent electrode 120 that are arranged adjacent to one another are arranged in a direction different from directions the pixels Pix are arrayed in. Specifically, considering that a virtual straight line L7 drawn by passing through the centers of one of the slits S12 and a corresponding one of the isolated slits S2, this virtual straight line L7 may form an angle $\theta 2$ (for example, $\theta 2=39°$) with a line extending in the lateral direction (or the X axis). Alternatively, the respective slits S2 which are formed in the line-shaped electrodes 111 and 112 and the transparent electrode 120 and which are arranged adjacent to one another may be aligned with a straight line in the extending direction of the slits S2.

When a voltage is applied between the transparent electrode layer 15 (transparent electrodes 110 and 120) and the transparent electrode layer 17, if the potential difference therebetween becomes large, the light transmittance of the liquid crystal layer 19 increases. In this case, the opening-closing sections 11 and 12 enter a transmission state (or the open state). Meanwhile, if the potential difference becomes small, the light transmittance of the liquid crystal layer 19 decreases, and the opening-closing sections 11 and 12 enter a blocking state (or the closed state).

In this embodiment, the liquid crystal barrier section 10 performs a normally black operation. However, the operation of the liquid crystal barrier section 10 is not limited thereto. Alternatively, for example, the liquid crystal barrier section 10 may perform a normally white operation. In this case, when the potential difference between the transparent electrode layer 15 and the transparent electrode layer 17 becomes large, the opening-closing sections 11 and 12 enter a blocking state. Meanwhile, when the potential difference becomes small, the opening-closing sections 11 and 12 enter a transmission state. Note that the selection between the normally black and normally white operations may be made on the basis of, for example, the polarization plate and the liquid crystal orientation.

In the liquid crystal barrier section 10, the opening-closing sections 12 configure groups, and the opening-closing sections 12 belonging to the same group carry out open or close operations at the same timing, upon stereoscopic display. In the following, groups of the opening-closing sections 12 will be described.

Figure 9:
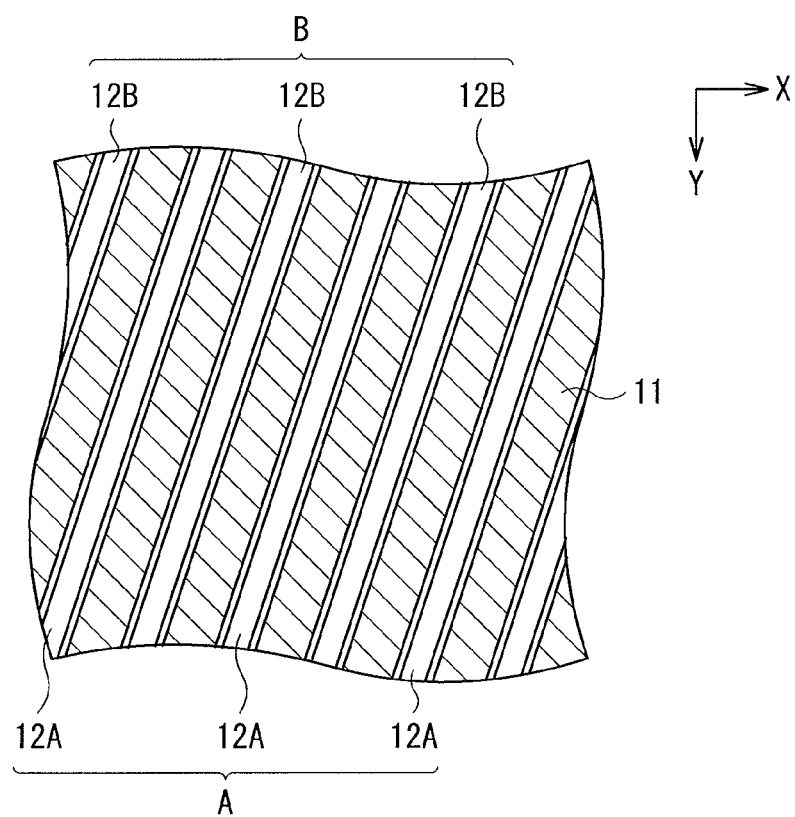
FIG. 9 is a view depicting an example of grouping of the liquid crystal barrier section shown in FIG. 1.

FIG. 9 is a view depicting an example of groups configured by the opening-closing sections 12. In this example, the opening-closing sections 12 configure two groups. Specifically, an alternate one and the other alternate one of the arranged opening-closing sections 12 configure groups A and B, respectively. In the following description, the opening-closing sections 12 belonging to the group A are referred to as "opening-closing sections 12A" as appropriate, and likewise, the opening-closing sections 12 belonging to the group B are referred to as "opening-closing sections 12B" as appropriate.

Upon stereoscopic display, the barrier driving section 9 drives the opening-closing sections 12, such that the opening-closing sections 12 belonging to the same group perform open or close operations at the same timing. In more detail, the barrier driving section 9 drives the opening-closing sections 12A belonging to the groups A and the opening-closing sections 12B belonging to the group B so as to perform open or close operations alternately in a time division manner.

FIGS. 10A, 10B, and 10C are schematic views depicting the state of the liquid crystal barrier section 10 upon stereoscopic display and normal display (or 2D display), by using a cross section of the liquid crystal barrier section 10. FIG. 10A is a view depicting a state of the liquid crystal barrier section 10 upon stereoscopic display, FIG. 10B is a view depicting another state of the liquid crystal barrier section 10 upon stereoscopic display, and FIG. 10C is a view depicting a state of the liquid crystal barrier section 10 upon normal display. In the liquid crystal barrier section 10, the opening-closing sections 11 and the opening-closing sections 12 (opening-closing sections 12A and 12B) are arranged alternately. FIGS. 10A, 10B, and 10C show examples in which one opening-closing section 12A is provided for six pixels Pix of the display section 20. Likewise, one opening-closing section 12B is provided for six pixels Pix of the display section 20.

Upon stereoscopic display, the image signals SA and SB are supplied alternately to the display driving section 50. In response to these image signals, the display section 20 displays images in a time division manner. The liquid crystal barrier section 10 causes the opening-closing sections 12 (opening-closing sections 12A and 12B) to perform open or close operations, in synchronization with the images displayed in a time division manner. Also, the liquid crystal barrier section 10 causes the opening-closing section 11 to maintain a closed state (blocking state). In more detail, when the image signal SA is supplied to the display driving section 50, the opening-closing sections 12A and 12B enter open and closed states, respectively, as shown in FIG. 10A. In this case, six pixels Pix, which are disposed adjacent to one another and at a location corresponding to one opening-closing section 12A, display respective six perspective images included in the image signal SA, as described later. Consequently, for example, when seeing different perspective images with the right and left eyes independently, the viewer recognizes the displayed images as a stereoscopic image, as described later. Likewise, when the image signal SB is supplied, the opening-closing sections 12B and 12A enter the open and closed states, respectively, as shown in FIG. 10B. In this case, six pixels Pix, which are disposed adjacent to one another and at a location corresponding to one opening-closing section 12B, display respective six perspective images included in the image signal SB, as described later. Consequently, for example, when seeing different perspective images with right and left eyes independently, the viewer recognizes the displayed images as a stereoscopic image, as described later. As described above, since the display device 1 displays images while causing the opening-closing sections 12A and 12B to open alternately, the resolution of the images increases in the display device.

Meanwhile, upon normal display (2D display), the liquid crystal barrier section 10 causes both the opening-closing section 11 and the opening-closing section 12 (opening-closing sections 12A and 12B) to maintain the open state (transmission state), as shown in FIG. 10C. This enables the viewer to see a normal 2D image as it is which the display section 20 displays on the basis of the image signal S.

(Operation and Effect)

Next, a description will be given below of an operation and effect of the display device 1 according to this embodiment.

(Whole Operation)

First, whole operation of the display device 1 will be described with reference to FIG. 1. The control section 40 supplies the respective control signals to the display driving section 50, the backlight driving section 29, and the barrier driving section 9, on the basis of the image signal Vdisp to be supplied from an external source. The control section 40 controls the display driving section 50, the backlight driving section 29, and the barrier driving section 9 to operate in synchronization with one another. The backlight driving section 29 drives the backlight 30 on the basis of the backlight control signal CBL to be supplied from the control section 40. The backlight 30 emits a light ray from a whole surface thereof toward the display section 20. The display driving section 50 drives the display section 20, on the basis of the image signal S to be supplied from the control section 40. The display section 20 displays an image by modulating the light ray emitted from the backlight 30. The barrier driving section 9 drives the liquid crystal barrier section 10, on the basis of the barrier control signal CBR to be supplied from the control section 40. The liquid crystal barrier section 10 causes the opening-closing sections 11 and 12 (12A and 12B) to perform open or close operations, on the basis of the barrier control signal CBR. As a result, a light ray which has been emitted from the backlight 30 through the display section 20 is allowed to pass through the liquid crystal barrier section 10 or is blocked.

(Detailed Operation Upon Stereoscopic Display)

Next, a description will be given below of a detailed operation of the display device 1 upon stereoscopic display, with reference to some of the accompanying drawings.

FIGS. 11A and 11B are views depicting an example of an operation of the display section 20 and the liquid crystal barrier section 10. Specifically, FIGS. 11A and 11B are views depicting the operations when image signals SA and SB are supplied, respectively.

As shown in FIG. 11A, when the image signal SA is supplied to the display driving section 50, respective pixels Pix of the display section 20 display pieces of pixel information P1 to P6 that correspond to six perspective images included in the image signal SA. In this case, the pieces of pixel information P1 to P6 are displayed at respective pixels Pix that are located in the vicinity of a corresponding one of the opening-closing sections 12A. When the image signal SA is supplied, the liquid crystal barrier section 10 controls the opening-closing sections 12A and 12B to enter an open state (transmission state) and a closed state, respectively. Each opening-closing section 12A specifies the individual angles of the light rays output from the pixels Pix of the display section 20. For example, when seeing the pixel information P3 with the left eye and the pixel information P4 with the right eye, the viewer recognizes a stereoscopic image.

Meanwhile, as shown in FIG. 11B, when the image signal SB is supplied to the display driving section 50, respective pixels Pix of the display section 20 display pieces of pixel information P1 to P6 that correspond to six perspective images included in the image signal SB. In this case, the pieces of pixel information P1 to P6 are displayed at respective pixels Pix that are located in the vicinity of a corresponding one of the opening-closing sections 12B. When the image signal SB is supplied, the liquid crystal barrier section 10 controls the opening-closing sections 12B and 12A to the open state (transmission state) and the closed state, respectively. Each opening-closing section 12B specifies the individual angles of the light rays output from the pixels Pix of the display section 20. For example, when seeing the pixel information P3 with the left eye and the pixel information P4 with the right eye, the viewer recognizes a stereoscopic image.

In this way, when seeing one of the pieces of pixel information P1 to P6 with the right eye and another one thereof with the left eye, the viewer perceives a stereoscopic image. In addition, since the display section 20 opens the opening-closing sections 12A and 12B alternately in a time division manner upon display, the viewer sees an average of images displayed at locations shifted from each other. Therefore, the display device 1 achieves the displaying of an image having twice the resolution of an image which a display device provided with the opening-closing sections 12A alone displays. Thus, the resolution of 3D image that the display device 1 displays may suffice to be one-third ($=\frac{1}{6} \times 2$) of that of a 2D image.

Now, a description will be given below of an orientation of liquid crystal molecules M in the liquid crystal layer 19 of the liquid crystal barrier section 10.

FIG. 8 schematically depicts an orientation of liquid crystal molecules M in branch regions 81 and 82, when a voltage is applied. Note that the following description will be given by using the transparent electrode 110 (opening-closing section 11) as an example, for the sake of convenience, but this description is also applied to the transparent electrode 120 (opening-closing section 12).

While no voltage is applied between the transparent electrode 110 (transparent electrode layer 15) and the transparent electrode layer 17, the orientation of the liquid crystal molecules M is perpendicular to the transparent electrode layers 15 and 17. In this state, the opening-closing section 11 of the liquid crystal barrier section 10 blocks a light ray from passing therethrough, namely, is in the closed state. On the other hand, while a voltage is being applied between the transparent electrode 110 (transparent electrode layer 15) and the transparent electrode layer 17, the liquid crystal molecules M lay down in a radial fashion for each small region 151 and with respect to the center of a corresponding one of the pin holes 17H in the transparent electrode layer 17. Specifically, as shown in FIG. 8, the individual orientations of the liquid crystal molecules M are arranged as to extend in a radial fashion with respect to the center of the pin hole 17H on an X-Y plane parallel to the long axes of the liquid crystal molecules M. In this state, the opening-closing section 11 of the liquid crystal barrier section 10 allows a light ray to pass therethrough, namely, is in the open state.

Comparative Example

Next, a description will be given below of a behavior of the display device 1 according to this embodiment, in comparison with that of the following comparative example. This comparative example provides the same structure as the above-mentioned embodiment, except for a planar shape of transparent electrodes in a liquid crystal barrier section.

Figure 12:
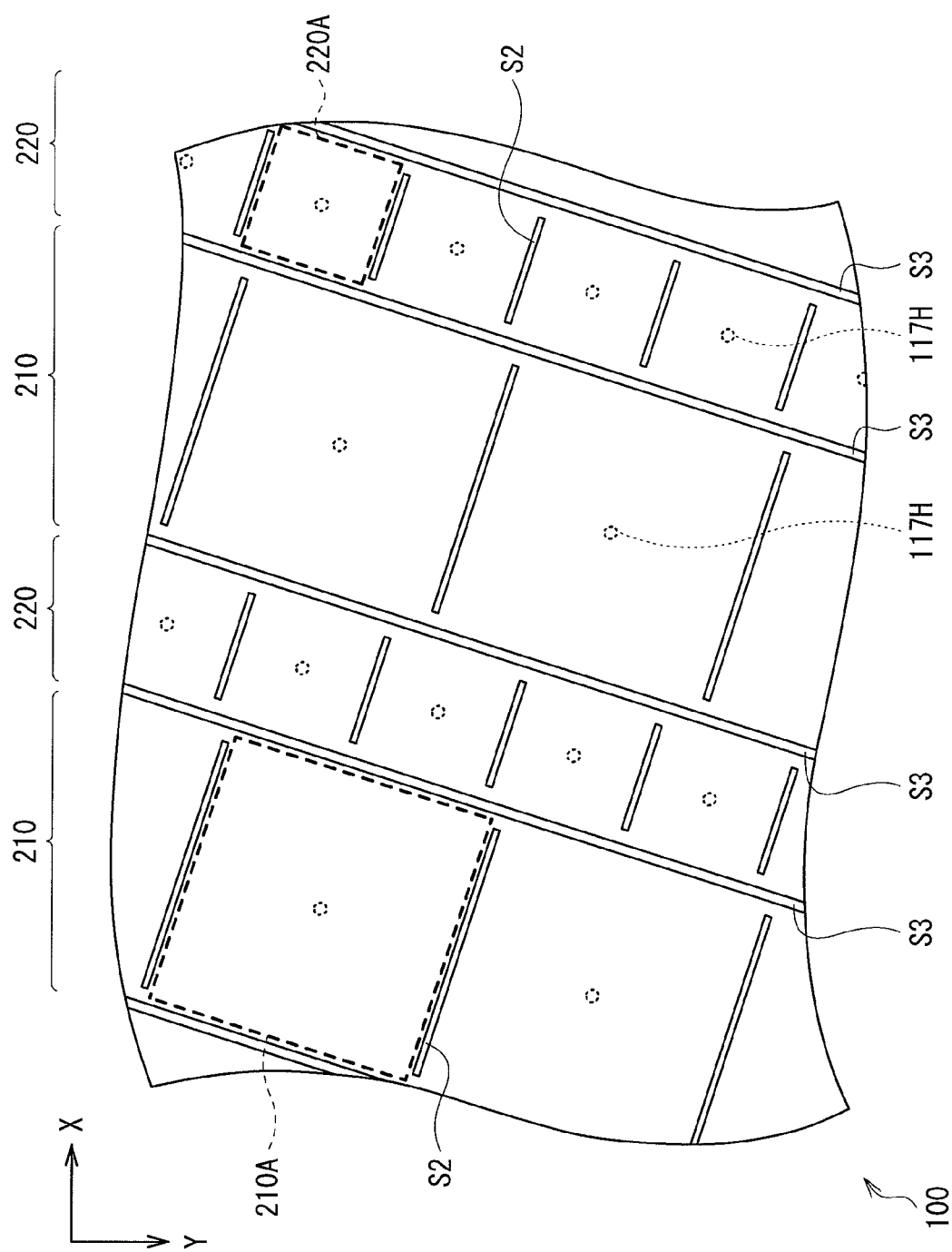
FIG. 12 is a plan view depicting an example of a structure of transparent electrodes in a liquid crystal barrier section according to a comparative example.

FIG. 12 is a view depicting an example of a structure of transparent electrodes 210 and 220 in a liquid crystal barrier section 100 that is a comparative example. The transparent electrodes 210 and 220 are each a line-shaped electrode extending in an extending direction of the opening-closing sections 11 and 12, and are separated from one another by the corresponding slits S3. The respective widths of the transparent electrodes 210 and 220 correspond to the width E1 of the opening-closing section 11 and the width E2 of the opening-closing section 12. FIG. 12 illustrates an example in which E1 is approximately equal to 2×E2, and the width of the transparent electrode 210 is about twice as long as that of the transparent electrode 220. Specifically, in the liquid crystal barrier section 100, the slits S3 are arranged at irregular intervals, and broader and narrower regions are arranged alternately. Each of the transparent electrodes 210 and 220 does not include slits S1 that should extend in the extending direction of the opening-closing sections 11 and 12, but includes only slits S2 that extend along the widths of the transparent electrodes 210 and 220 and should intersect the slits S1. These slits S2 are arranged in the extending direction of the opening-closing sections 11 and 12 while being separated away from one another by a distance being as long as the slit S2. Accordingly, each transparent electrode 210 is partitioned into multiple square regions 210A by the slits S2 and S3. Likewise, each transparent electrode 220 is partitioned into multiple square regions 220A by the slits S2 and S3. In this case, the region 210A has approximately fourth the area of the region 220A.

When either of the liquid crystal barrier sections 10 or 100 is overlaid with the display section 20, the viewer visually recognizes the slits S2 and S3, as lines being darker than surrounding regions. In this case, when the liquid crystal barrier section 100 of the comparative example is used, the intervals of the dark lines are highly irregular, because the individual areas of the regions 210A and 220A greatly differ from each other. Therefore, the apparent brightness of the liquid crystal barrier section 10 which the viewer visually recognizes is heavily dependent on a location in a direction parallel to a display screen. Thus, since interference fringes (or moire) are prone to appear on an image displayed on the display screen, the liquid crystal barrier section 100 of the comparative example is undesirable. In contrast, when the liquid crystal barrier section 10 of this embodiment is used, the intervals of the dark lines are relatively regular. This is because the difference in area between the regions 111A, 112A, and 120A is more minor than that between the regions 210A and 220A in the liquid crystal barrier section 100. Therefore, the apparent brightness of the liquid crystal barrier section 100 which the viewer visually recognizes is substantially uniform throughout a displayed screen. The liquid crystal barrier section 10 of this embodiment makes it possible to suppress the occurrence of interference fringes (or moire) on a displayed image due to the slits S1 to S4.

(Effect)

As described above, in the display device 1 of this embodiment, each transparent electrode 110 of the liquid crystal barrier section 10 includes pairs of line-shaped electrodes 111 and 112, each pair of which are arranged to oppose each other with the slit S4 in between that extends in a predetermined direction different from the array directions of the pixels Pix. In addition, each of the line-shaped electrodes 111 and 112 includes the slits S1 and S2 extending in respective directions different from the array directions of the pixels Pix. Accordingly, even if the respective widths of the transparent electrode 110 and 120 greatly differ from each other, the interval of the dark lines, due to the slits, which the viewer visually recognizes is made less irregular. This decreases the nonuniformity of the apparent brightness of the whole display screen, thus making it possible to effectively suppress the occurrence of moire on an image upon both of 2D and 3D displays, and to achieve an improved image. In particular, by setting each of the small regions 111A and 112A to be smaller than a region which one of the pixels Pix of the display section 20 occupies, the nonuniformity of the apparent brightness of the whole display screen is decreased more effectively, so that the occurrence of moire on an image is better suppressed.

Moreover, in the display device 1 of this embodiment, each of the opening-closing sections 11 and 12 of the liquid crystal barrier section 10 extends in the direction that is inclined with respect to the array directions the pixels Pix of the display section 20. This enables the improvement in the balance between lateral and vertical resolutions upon stereoscopic display.

Figure 13:
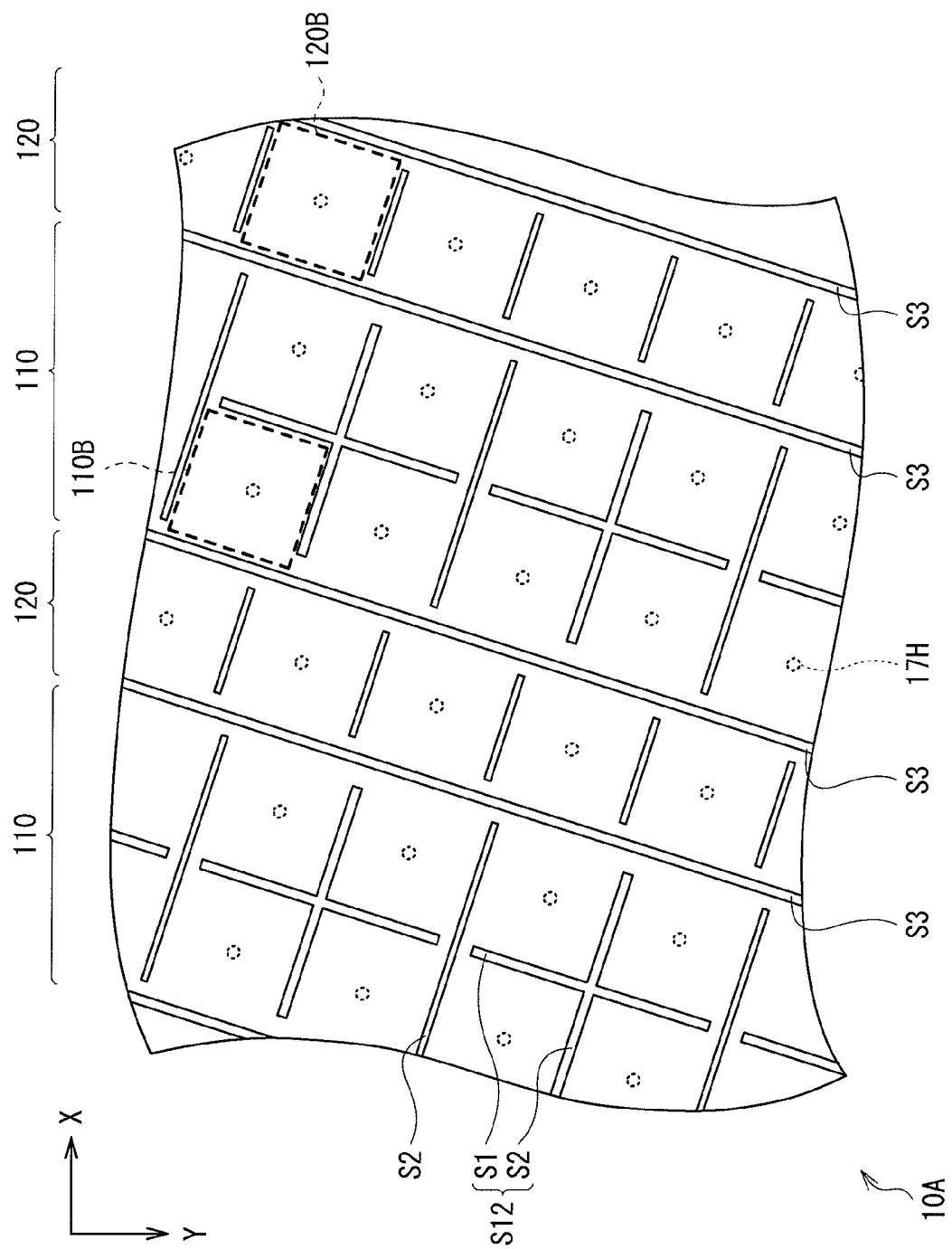
FIG. 13 is a view depicting an example of a structure of transparent electrodes in a liquid crystal barrier section according to a modification 1.

Up to this point, the present technology has been explained by using some embodiments. However, the present technology is not limited to those embodiments and the like, and various modifications are possible. For example, in the above-mentioned embodiment, each transparent electrode 110 of the liquid crystal barrier section 10 includes the pairs of line-shaped electrodes 111 and 112, each pair of which are arranged to oppose each other with the slit S4 in between. However, the present technology is not limited thereto. Alternatively, for example, just like a liquid crystal barrier section 10A of a modification (modification 1) shown in FIG. 13, each transparent electrode 110 may include a single line-shaped electrode having slits S1 and S2. Specifically, each transparent electrode 110 may be partitioned into multiple regions 110B having, for example, a square shape. Even in this case, since the difference in area between the region 110B and a region 120B of the transparent electrode 120 is minor, the using of the liquid crystal barrier section 10A makes it possible to decrease the irregularity of the intervals of the dark lines better than using of the liquid crystal barrier section 100 according to the comparative example. Consequently, a display device equipped with the liquid crystal barrier section 10A according to the modification 1 suppresses the occurrence of moire on an image effectively, thus enabling the presentation of high quality images.

Figure 14:
FIG. 14 is a view depicting an example of a structure of transparent electrodes in a liquid crystal barrier section according to a modification 2.

Furthermore, for example, just like a liquid crystal barrier section 10B of a modification (modification 2) shown in FIG. 14, each region 110B may be partitioned into multiple small regions 110C by a slit S22 having a cross shape, as well as each region 120B may be partitioned into multiple small regions 120C by the slit S22. A display device equipped with this liquid crystal barrier section 10B according to the modification 2 makes it possible to further decrease the nonuniformity of the apparent brightness of a display screen.

Figure 15:
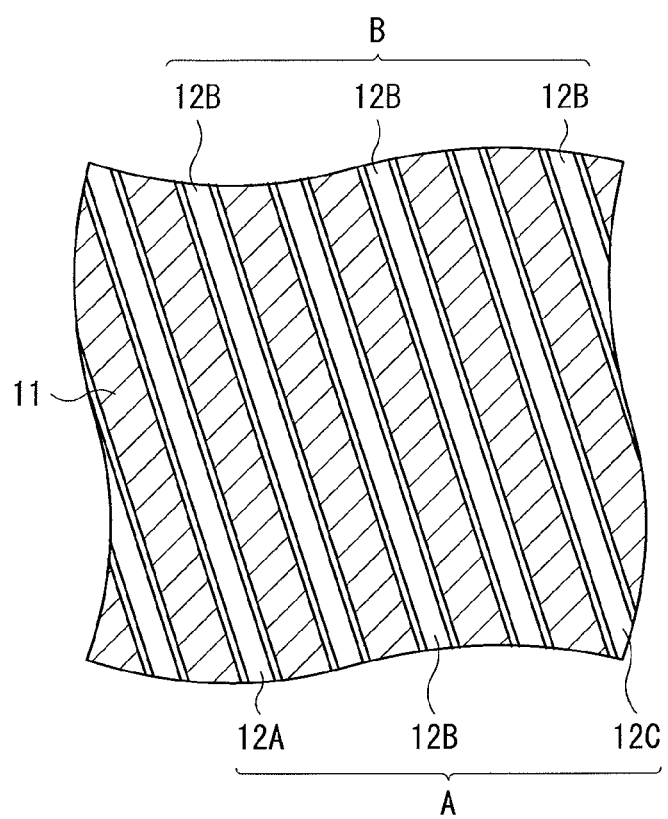
FIG. 15 is a view depicting an example of a structure of opening-closing sections in a liquid crystal barrier section according to a modification 3.

In the above-described embodiment, the opening-closing sections 11 and 12 of the liquid crystal barrier section 10 extend in a right oblique direction with respect to the lateral direction (or the X axis). However, the present technology is not limited thereto. Alternatively, for example, just like opening-closing sections 11 and 12 (12A and 12B) of a modification (modification 3) shown in FIG. 15, the opening-closing sections 11 and 12 may extend in a left oblique direction with respect to the lateral direction. In addition, although set to 18 degrees in this embodiment, the angle θ1 may be set to any other value.

Figure 16A:
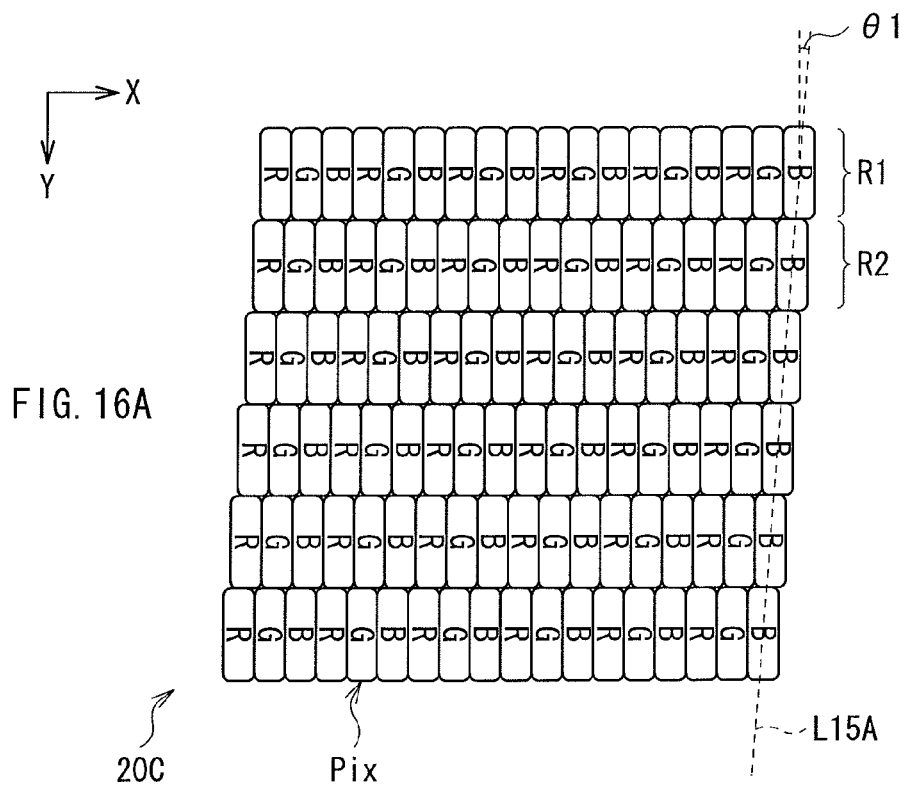
FIGS. 16A and 16B are views depicting an example of an array of pixels in a display section according to a modification 4, and an example of an arrangement of opening-closing sections in a liquid crystal barrier section according to the modification 4.
Figure 16B:
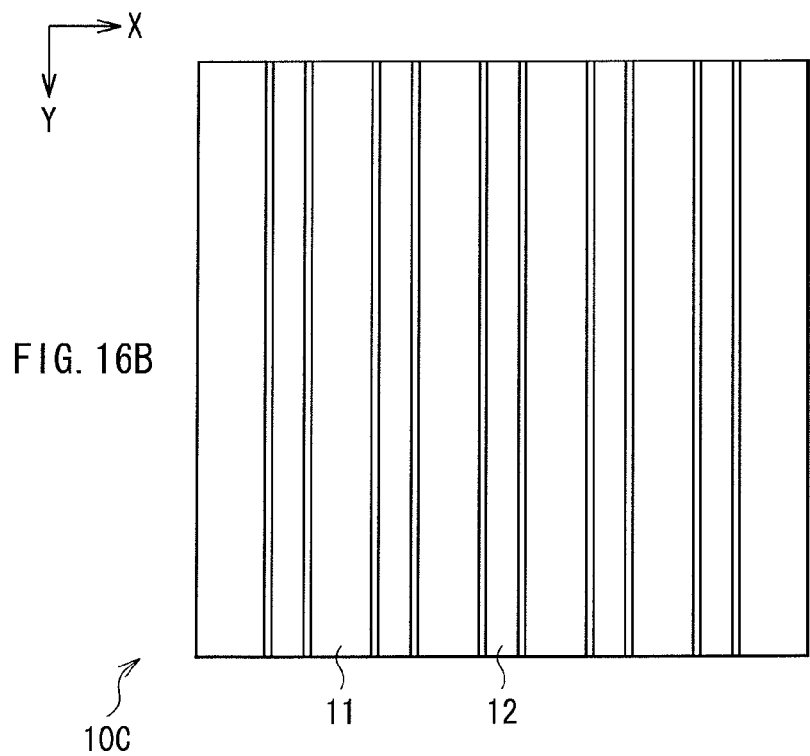

In the above-mentioned embodiment, the pixels Pix of the display section 20 are arrayed in the lateral and vertical directions, and the opening-closing sections 11 and 12 of the liquid crystal barrier section 10 extend in the oblique direction. However, the present technology is not limited thereto. Alternatively, the arrangements of the pixels Pix and the opening-closing sections 11 and 12 may be, for example, those shown in FIGS. 16A and 16B. In more detail, the pixels Pix are arrayed in the lateral and oblique directions, and the opening-closing sections 11 and 12, or the slits S1 and S2 (not shown), may extend in the vertical direction (or on the Y axis). FIG. 16A is a view depicting an array of a display section 20C according to a modification (modification 4), and FIG. 16B is a view depicting an arrangement of the opening-closing sections 11 and 12 in a liquid crystal barrier section 10C according to the modification 4. As shown in FIG. 16A, in a display section 20C of this modification, the pixels Pix constitute multiple rows that extend on the X axis and are arranged adjacent to one another on the Y axis. With regard to rows R1 and R2, a virtual straight line L15A that passes through a center of one of the pixels Pix in the pixel row R1 and a center of a corresponding one of the pixels Pix in the pixel column R2 forms an angle θ1 with a line extending in the vertical direction (or the Y axis). Even a display device equipped with the display section 20C and the liquid crystal barrier section 10C according to the modification 4 produces the same effect as the display device 1 of this embodiment.

Figure 17A:
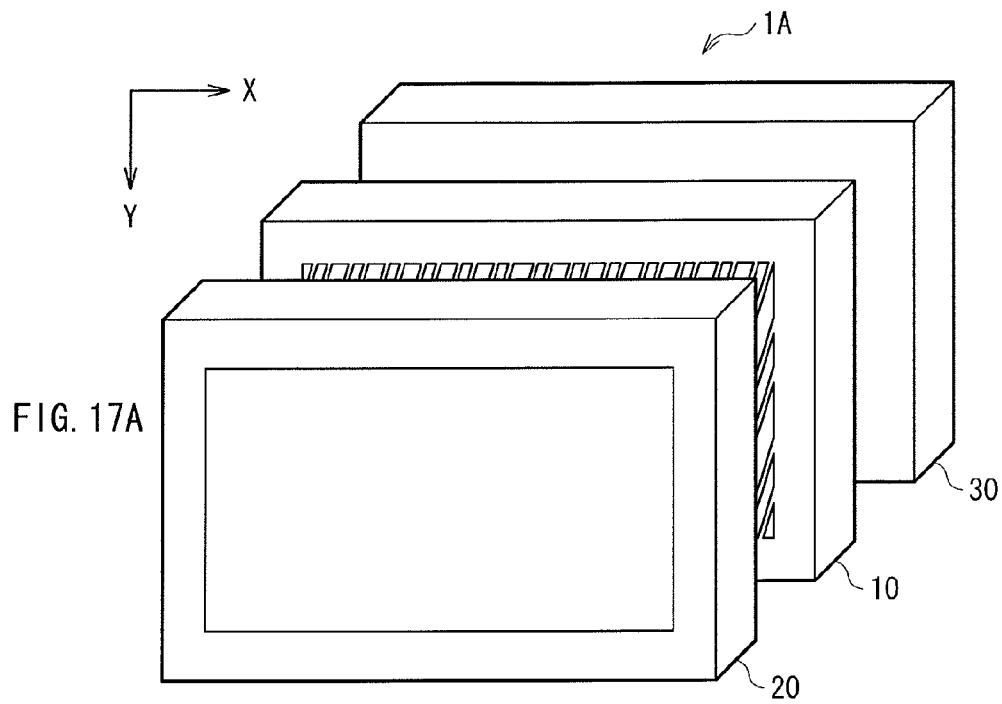
FIGS. 17A and 17B are views depicting an example of a structure of a display device according to a modification 5.
Figure 17B:
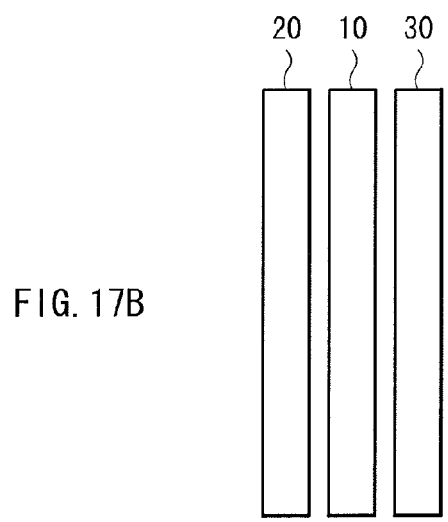

In the above-described embodiment, the liquid crystal barrier section 10, the display section 20, and the backlight 30 in the display device 1 are arranged in this order from the location of the viewer. However, the arrangement of the liquid crystal barrier section 10, the display section 20, and the backlight 30 is not limited thereto. Alternatively, for example, just like a display device 1A according a modification (modification 5) shown in FIGS. 17A and 17B, the display section 20, the liquid crystal barrier section 10, and the backlight 30 may be arranged in this order from the location of the viewer. FIGS. 18A and 18B are views depicting an example of an operation of the display section 20 and the liquid crystal barrier section 10 in the display device 1A of the modification 5 shown in FIGS. 17A and 17B. In more detail, FIG. 18A is a view depicting an example of the operation when the image signal SA is supplied, and FIG. 18B is a view depicting an example of the operation when the image signal SB is supplied. In the display device 1A of the modification 5, first, a light ray emitted from the backlight 30 enters the liquid crystal barrier section 10. Then, the parts of this light ray pass through the opening-closing sections 12A and 12B. Following this, the display section 20 modulates the parts of the light ray, and outputs the modulated parts, as six perspective images.

Furthermore, in the above-mentioned embodiment, the opening-closing sections 12 constitute two groups, but the number of groups is not limited to two. Alternatively, the opening-closing sections 12 may constitute more than two groups, in order to further improve the resolution of a displayed image.

Moreover, in the above-mentioned embodiment, the display section 20 is a liquid crystal display section, but is not limited thereto. Alternatively, the display section 20 may be, for example, an EL (electro luminescence) display section including an organic EL. In this case, the backlight driving section 29 and the backlight 30 shown in FIG. 1 may be eliminated.

Thus, it is possible to achieve at least the following configurations from the above-described example embodiments of the disclosure.

(1) A display device, including:
   a display section including a plurality of display pixels; and
   a liquid crystal barrier section including a plurality of barrier regions, each of the barrier regions extending in a first direction that is inclined with respect to an array direction of the display pixels, and allowing light to transmit therethrough and blocking the light, wherein the liquid crystal barrier section includes
   a liquid crystal layer, and
   a first electrode layer and a second electrode layer interposing the liquid crystal layer in between,
   the first electrode layer includes a plurality of line-shaped electrodes, the line-shaped electrodes extending in the first direction and being arranged side-by-side in a second direction different from the first direction, and one or more of the line-shaped electrodes includes first slits and second slits, the first and the second slits extending in respective directions different from the array direction of the display pixels.
(2) The display device according to (1), wherein a third slit is provided between the line-shaped electrodes.
(3) The display device according to (1) or (2), wherein the first slits and the second slits extend in the first direction and the second direction, respectively.
(4) The display device according to (3), wherein a length of each of the second slits is shorter than a width of any one of the line-shaped electrodes in the second direction.
(5) The display device according to any one of (1) to (4), wherein the second slits are arranged in the first direction and intersect corresponding ones of the first slits alternately.
(6) The display device according to (5), wherein the second electrode layer has a plurality of pin holes, each of the pin holes being provided in corresponding one of regions defined by the first slits and the second slits in each of the line-shaped electrodes.
(7) The display device according to (6), wherein each of the defined regions is smaller than a region occupied by any one of the display pixels.
(8) The display device according to any one of (1) to (7), wherein the first slits and the second slits extend intersecting each other.
(9) The display device according to any one of (1) to (8), wherein the second slits are arranged substantially at regular intervals in the first direction, and the first slits are disposed in respective locations at which each of the line-shaped electrodes is split into substantially two halves in the second direction.
(10) The display device according to any one of (1) to (9), wherein an arrangement direction of the respective second slits in the line-shaped electrodes that are adjacent to one another differs from the array direction of the display pixels.
(11) The display device according to any one of (1) to (9), wherein the second slits in the line-shaped electrodes that are adjacent to one another are aligned in a collinear fashion.
(12) The display device according to any one of (1) to (11), wherein each of the line-shaped electrodes includes a first line-shaped electrode and a second line-shaped electrode that is wider than the first line-shaped electrode, and the second line-shaped electrode includes both the first slits and the second slits.
(13) The display device according to (1), wherein a plurality of display modes are included, the display modes including a three-dimensional image display mode and a two-dimensional image display mode,
each of the barrier regions includes a first sub-region and a second sub-region,
the display section displays a plurality of different perspective images, and the first sub-region is in a transmission state and the second sub-region is in a blocking state, to allow a three-dimensional image to be displayed in the three-dimensional image display mode, and
the display section displays a single perspective image, and the first and the second sub-regions are in the transmission state, to allow a two-dimensional image to be displayed in the two-dimensional image display mode.
(14) The display device according to (13), wherein the second sub-region includes a pair of the line-shaped electrodes that are arranged to oppose each other with a third slit extending in the first direction in between, the pair of the line-shaped electrodes including respective portions electrically connected to each other.
(15) The display device according to any one of (1) to (14), wherein the display section includes a signal line and a scan line that apply a voltage to the display pixels, and the array direction of the display pixels is a direction along an extending direction of the signal line and an extending direction of the scan line.

The present disclosure contains subject matter related to that disclosed in Japanese Priority Patent Application JP 2011-094269 filed in the Japan Patent Office on Apr. 20, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display device, comprising:
a display section including a plurality of display pixels; and
a liquid crystal barrier section including a plurality of barrier regions, each of the barrier regions extending in a first direction that is inclined with respect to an array direction of the display pixels, and allowing light to transmit therethrough and blocking the light, wherein the liquid crystal barrier section includes
a liquid crystal layer, and
a first electrode layer and a second electrode layer interposing the liquid crystal layer in between,
the first electrode layer includes a plurality of line-shaped electrodes, the line-shaped electrodes extending in the first direction and being arranged side-by-side in a second direction different from the first direction, and
one or more of the line-shaped electrodes includes first slits and second slits, the first and the second slits extending in respective directions different from the array direction of the display pixels.
2. The display device according to claim 1, wherein a third slit is provided between the line-shaped electrodes.
3. The display device according to claim 1, wherein the first slits and the second slits extend in the first direction and the second direction, respectively.
4. The display device according to claim 3, wherein a length of each of the second slits is shorter than a width of any one of the line-shaped electrodes in the second direction.
5. The display device according to claim 1, wherein the second slits are arranged in the first direction and intersect corresponding ones of the first slits alternately.
6. The display device according to claim 5, wherein the second electrode layer has a plurality of pin holes, each of the pin holes being provided in corresponding one of regions defined by the first slits and the second slits in each of the line-shaped electrodes.
7. The display device according to claim 6, wherein each of the defined regions is smaller than a region occupied by any one of the display pixels.
8. The display device according to claim 1, wherein the first slits and the second slits extend intersecting each other.
9. The display device according to claim 1, wherein the second slits are arranged substantially at regular intervals in the first direction, and the first slits are disposed in respective locations at which each of the line-shaped electrodes is split into substantially two halves in the second direction.
10. The display device according to claim 1, wherein an arrangement direction of the respective second slits in the line-shaped electrodes that are adjacent to one another differs from the array direction of the display pixels.

11. The display device according to claim 1, wherein the second slits in the line-shaped electrodes that are adjacent to one another are aligned in a collinear fashion.

12. The display device according to claim 1, wherein each of the line-shaped electrodes includes a first line-shaped electrode and a second line-shaped electrode that is wider than the first line-shaped electrode, and the second line-shaped electrode includes both the first slits and the second slits.

13. The display device according to claim 1, wherein a plurality of display modes are included, the display modes including a three-dimensional image display mode and a two-dimensional image display mode,
- each of the barrier regions includes a first sub-region and a second sub-region,
- the display section displays a plurality of different perspective images, and the first sub-region is in a transmission state and the second sub-region is in a blocking state, to allow a three-dimensional image to be displayed in the three-dimensional image display mode, and
- the display section displays a single perspective image, and the first and the second sub-regions are in the transmission state, to allow a two-dimensional image to be displayed in the two-dimensional image display mode.

14. The display device according to claim 13, wherein the second sub-region includes a pair of the line-shaped electrodes that are arranged to oppose each other with a third slit extending in the first direction in between, the pair of the line-shaped electrodes including respective portions electrically connected to each other.

15. The display device according to claim 1, wherein the display section includes a signal line and a scan line that apply a voltage to the display pixels, and the array direction of the display pixels is a direction along an extending direction of the signal line and an extending direction of the scan line.

* * * * *